US012718781B2

(12) United States Patent
Kim et al.

(10) Patent No.: US 12,718,781 B2
(45) Date of Patent: Aug. 25, 2026

(54) DISPLAY DEVICE AND OPERATING METHOD THEREOF

(71) Applicant: LG ELECTRONICS INC., Seoul (KR)

(72) Inventors: Sorin Kim, Seoul (KR); Byungwoo Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/871,089

(22) PCT Filed: Jun. 3, 2022

(86) PCT No.: PCT/KR2022/007899
§ 371 (c)(1),
(2) Date: Dec. 2, 2024

(87) PCT Pub. No.: WO2023/234445
PCT Pub. Date: Dec. 7, 2023

(65) Prior Publication Data
US 2025/0356789 A1 Nov. 20, 2025

(51) Int. Cl.
*G09G 5/10* (2006.01)
*G09G 3/3233* (2016.01)

(52) U.S. Cl.
CPC ............ *G09G 5/10* (2013.01); *G09G 3/3233* (2013.01); *G09G 2320/0257* (2013.01); *G09G 2320/046* (2013.01); *G09G 2360/16* (2013.01)

(58) Field of Classification Search
CPC .. G09G 3/2007; G09G 3/2092; G09G 3/3225; G09G 3/3233; G09G 2360/16; G09G 2320/0626; G09G 2330/021; G09G 5/10; G09G 2300/0452; G09G 2320/0257; G09G 2320/046
See application file for complete search history.

(56) References Cited

U.S. PATENT DOCUMENTS 9,589,499 B2 * 3/2017 Park .................... G09G 3/3225
2005/0276470 A1 12/2005 Kim et al.
2006/0284805 A1 12/2006 Baek
2010/0194769 A1 * 8/2010 Mori ........................ G09G 3/22 345/589
(Continued)

FOREIGN PATENT DOCUMENTS

JP 2005353069 12/2005
JP 2007147730 6/2007
(Continued)

OTHER PUBLICATIONS

PCT International Application No. PCT/KR2022/007899, International Search Report dated Feb. 28, 2023, 2 pages.
(Continued)

*Primary Examiner* — Xuemei Zheng
(74) *Attorney, Agent, or Firm* — LEE, HONG, DEGERMAN, KANG & WAIMEY

(57) ABSTRACT

A display device according to an embodiment of the present disclosure comprises: a display; and a controller for acquiring the luminance of an image to be output on the display on the basis of an average picture level (APL) of an input image, wherein the controller may acquire the APL on the basis of the chroma of the input image.

13 Claims, 11 Drawing Sheets

(56) References Cited

U.S. PATENT DOCUMENTS

| | | | | |
|---|---|---|---|---|
| 2011/0216097 A1* | 9/2011 | Yoo | G09G 3/3233 | 345/76 |
| 2014/0176625 A1* | 6/2014 | Yoon | G09G 3/3233 | 345/691 |
| 2023/0215355 A1* | 7/2023 | Kim | G09G 3/3208 | 345/691 |

FOREIGN PATENT DOCUMENTS

| | | |
|---|---|---|
| KR | 1020110099981 | 9/2011 |
| KR | 101147100 | 5/2012 |
| KR | 1020140081383 | 7/2014 |
| KR | 1020180059652 | 6/2018 |
| KR | 1020190012537 | 2/2019 |
| KR | 102185118 | 12/2020 |

OTHER PUBLICATIONS

European Patent Office Application Serial No. 22944983.0, Search Report dated May 22, 2025, 8 pages.

* cited by examiner

DISPLAY DEVICE AND OPERATING METHOD THEREOF

CROSS-REFERENCE TO RELATED APPLICATION(S)

This application is the National Stage filing under 35 U.S.C. 371 of International Application No. PCT/KR2022/007899, filed on Jun. 3, 2022, the contents of which are all incorporated by reference herein in its entirety.

TECHNICAL FIELD

The present disclosure relates to a display device and an operating method thereof.

BACKGROUND ART

Recently, the types of display devices have become more diverse. Among them, organic light emitting diode displays (hereinafter referred to as OLED displays) are widely used.

The OLED displays are display devices that use organic light emitting devices. Since the organic light emitting devices are self-luminous elements, the OLED displays have the advantage of lower power consumption and being thinner than liquid crystal displays that require backlights. In addition, the OLED displays have the advantage of wide viewing angles and fast response speeds. However, the organic light emitting devices have the disadvantage of having a relatively short lifespan. In particular, the organic light emitting devices have a problem of burn-in when continuously emitting light with high luminance, which shortens their lifespan.

Meanwhile, the OLED displays can determine luminance according to an APL (Average Picture Level) of an input image. For example, the APL can be determined based on the maximum value of RGB of the input image, and the luminance can be determined according to the APL determined in this way. In this case, there is a problem that the luminance decreases when a color image is input.

INVENTION

Technical Problem

The present disclosure is to minimize the problem of luminance degradation when a high-chromachroma image is input.

The present disclosure is to improve the problem of luminance degradation of a high-chromachroma image while minimizing the problem of afterimages occurring or pixel lifespan deteriorating due to high-luminance output.

Technical Solution

A display device according to an aspect of embodiments may include a display; and a controller configured to obtain a luminance of an image to be output from the display based on an APL (Average Picture level) of an input image, wherein the controller is configured to obtain the APL based on a chroma of the input image.

The controller may be configured to calculate a first APL based on a maximum RGB value of the input image, calculate a second APL based on a luminance ratio of the input image, and obtain a final APL by combining the first APL and the second APL based on the chroma.

The controller may be configured to adjust a proportion of the first APL and the second APL according to the chroma of the input image.

The controller may be configured to obtain the final APL so that the proportion of the second APL is higher than that of the first APL as the chroma of the input image becomes higher.

The controller may be configured to determine a weight based on the chroma of the input image, and adjust the proportion of the first APL and the second APL according to the weight.

The display device may further include a memory configured to store weight data that adjusts the proportion of the first APL and the second APL according to the weight.

The weight data may include a lookup table in which the chroma and the weight are mapped so that the proportion of the second APL is adjusted higher than that of the first APL as the chroma of the input image becomes higher.

The memory may be further configured to store PLC (Peak Luminance Curve) data to which the luminance of the output image according to the APL is mapped.

The display may be configured to output an image with a first luminance based on a full white image being input, and output an image with a second luminance higher than the first luminance based on an image including full red, full green, and full blue being input.

The controller may include an RGB acquisition module configured to obtain RGB of the input image; a chroma acquisition module configured to obtain a chroma of the input image; a weight acquisition module configured to obtain a weight based on the chroma of the input image; and an APL acquisition module configured to obtain the APL based on a weight.

A method of operating a display device according to another aspect of embodiments may include obtaining an APL (Average Picture level) of an input image; obtaining a luminance based on the APL of the input image; and outputting the image with the obtained luminance, wherein the method further comprising obtaining the APL based on a chroma of the input image.

The step of obtaining the APL may include calculating a first APL based on an RGB maximum value of the input image; calculating a second APL based on a luminance ratio of the input image; and obtaining a final APL by combining the first APL and the second APL based on the chroma.

The step of obtaining the APL may further include adjusting a proportion of the first APL and the second APL according to the chroma of the input image.

The step of adjusting the proportion of the first APL and the second APL may include determining a weight based on the chroma of the input image, and adjusting the proportion of the first APL and the second APL according to the weight.

The method of operating a display device may further include storing weight data in which the chroma and the weight are mapped so that the proportion of the second APL is adjusted higher than that of the first APL as the chroma of the input image becomes high.

Effect of the Invention

According to an embodiment of the present disclosure, a device that determines luminance according to an APL (Average Picture Level) and outputs an image can minimize the problem of luminance degradation due to chroma by obtaining an APL based on the chroma of an input image.

According to an embodiment of the present disclosure, by combining a first APL calculated based on the RGB maximum value according to chroma and a second APL calculated based on the luminance ratio to obtain a final APL, luminance degradation due to chroma can be minimized, while minimizing the problem of afterimage occurrence and pixel life degradation due to high luminance output caused by color components.

BEST MODE

Hereinafter, the present disclosure will be described in more detail with reference to the drawings.

Figure 1:
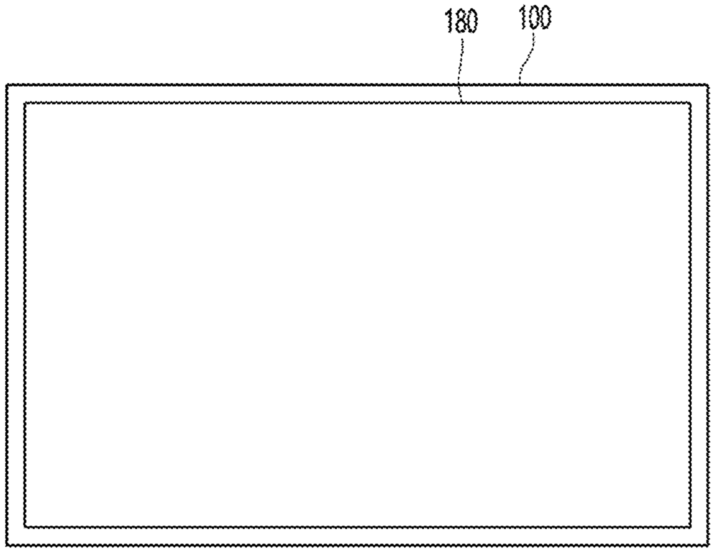
FIG. 1 is a diagram illustrating a display device according to an embodiment of the present disclosure.

FIG. 1 is a diagram illustrating a display device according to an embodiment of the present disclosure.

Referring to the diagram, a display device 100 may include a display 180.

Meanwhile, the display 180 may be implemented as one of various panels. For example, the display 180 may be one of a liquid crystal display panel (LCD panel), an organic light-emitting panel (OLED panel), an inorganic light-emitting panel (LED panel), and the like.

In the present disclosure, the display 180 is provided with the organic light-emitting panel (OLED panel). However, this is merely exemplary, and the display 180 may be provided with a panel other than the organic light-emitting panel (OLED panel).

Meanwhile, the display device 100 of FIG. 1 may be a monitor, TV, tablet PC, mobile terminal, and the like.

Figure 2:
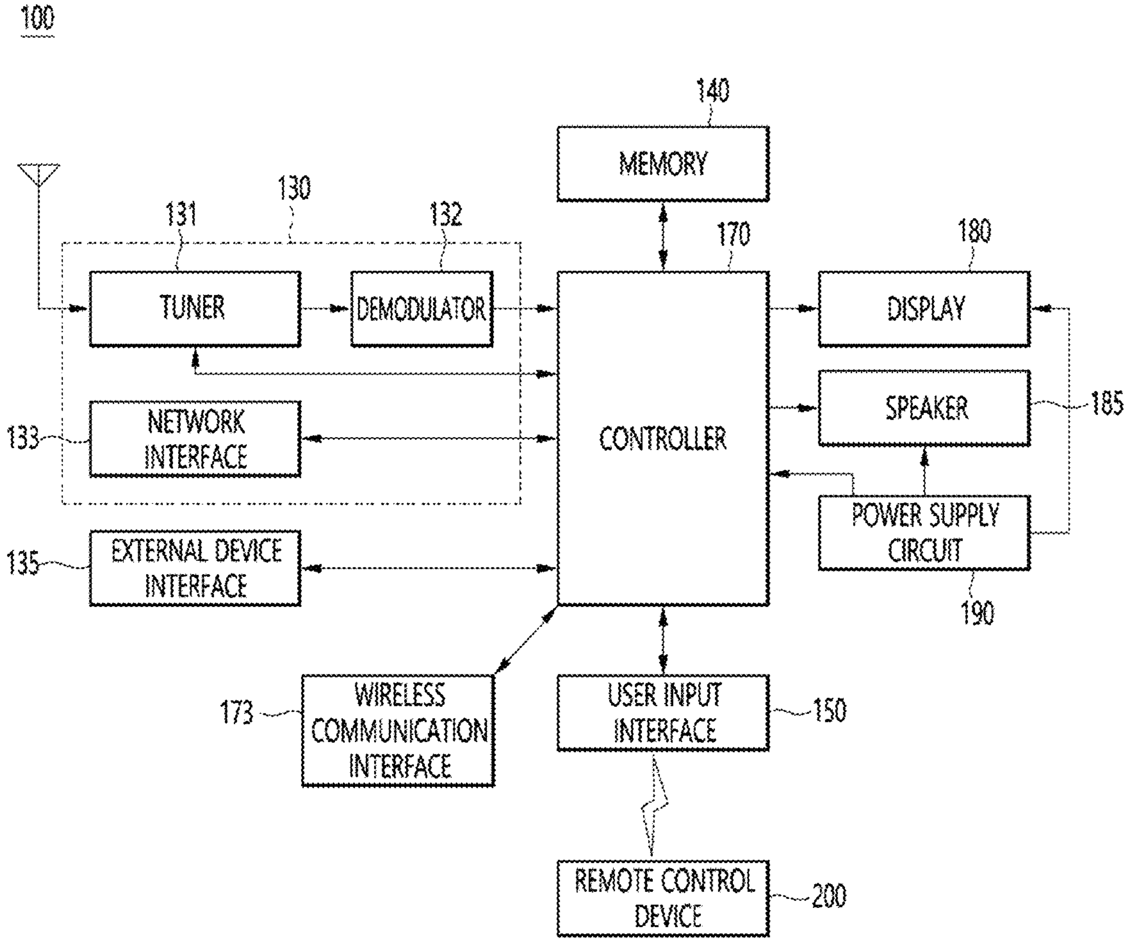
FIG. 2 is a block diagram illustrating a configuration of a display device according to an embodiment of the present disclosure.

FIG. 2 is a block diagram illustrating a configuration of a display device according to an embodiment of the present disclosure.

Referring to FIG. 2, a display device 100 may include a broadcast reception module 130, an external device interface 135, a memory 140, a user input interface 150, a controller 170, a wireless communication interface 173, a microphone 175, a display 180, a speaker 185, and a power supply circuit 190.

The broadcast reception module 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may divide the received broadcast signals into video signals, audio signals, and broadcast program-related data signals, and may restore the divided video signals, audio signals, and data signals into an output available form.

The network interface 133 may provide an interface for connecting the display device 100 to a wired/wireless network comprising internet network. The network interface 133 may transmit or receive data to or from another user or another electronic device through an accessed network or another network linked to the accessed network.

The network interface 133 may access a predetermined webpage through an accessed network or another network linked to the accessed network. That is, the network interface 133 may transmit or receive data to or from a corresponding server by accessing a predetermined webpage through the network.

The network interface 133 may receive content or data provided from a content provider or a network operator. That is, the network interface 133 may receive content, such as movies, advertisements, games, VODs, and broadcast signals, which are provided from the content provider or the network operator, and information relating thereto through the network.

In addition, the network interface 133 may receive firmware update information and update files provided from the network operator, and may transmit data to the Internet or content provider or the network operator.

The network interface 133 may select and receive a desired application among applications open to the public, through network.

The external device interface 135 may receive an application or an application list in an adjacent external device and deliver the application or the application list to the controller 170 or the memory 140.

The external device interface 135 may provide a connection path between the display device 100 and an external device. The external device interface 135 may receive at least one of an image or an audio outputted from an external device that is wirelessly or wiredly connected to the display device 100 and deliver the received image or the audio to the controller. The external device interface 135 may include a plurality of external input terminals. The plurality of external input terminals may include an RGB terminal, at least one High-Definition Multimedia Interface (HDMI) terminal, and a component terminal.

An image signal of an external device inputted through the external device interface 135 may be outputted through the display 180. A sound signal of an external device inputted through the external device interface 135 may be outputted through the speaker 185.

An external device connectable to the external device interface 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The memory 140 may store signal-processed image, voice, or data signals stored by a program in order for each signal processing and control in the controller 170.

In addition, the memory 140 may perform a function for temporarily storing image, voice, or data signals output from the external device interface 135 or the network interface 133, and may store information on a predetermined image through a channel memory function.

The memory 140 may store an application or an application list input from the external device interface 135 or the network interface 133.

The display device 100 may play content files (e.g., video files, still image files, music files, document files, application files, etc.) stored in the memory 140, and may provide the content files to a user.

The user input interface 150 may transmit signals input by a user to the controller 170, or may transmit signals from the controller 170 to a user. For example, the user input interface 150 may receive or process control signals such as power on/off, channel selection, and screen setting from the remote-control device 200 or transmit control signals from the controller 170 to the remote-control device 200 according to various communication methods such as Bluetooth, Ultra Wideband (WB), ZigBee, Radio Frequency (RF), and IR communication methods.

In addition, the user input interface 150 may transmit, to the controller 170, control signals input from local keys (not shown) such as a power key, a channel key, a volume key, and a setting key.

Image signals that are image-processed by the controller 170 may be input to the display 180 and displayed as images corresponding to the image signals. In addition, image signals that are image-processed by the controller 170 may be input to an external output device through the external device interface 135.

Voice signals processed by the controller 170 may be output to the speaker 185. In addition, voice signals processed by the controller 170 may be input to the external output device through the external device interface 135.

Additionally, the controller 170 may control overall operations of the display device 100.

In addition, the controller 170 may control the display device 100 by a user command or an internal program input through the user input interface 150, and may access the network to download a desired application or application list into the display device 100.

The controller 170 may output channel information selected by a user together with the processed image or voice signals through the display 180 or the speaker 185.

In addition, the controller 170 may output image signals or voice signals of an external device such as a camera or a camcorder, which are input through the external device interface 135, through the display 180 or the speaker 185, according to an external device image playback command received through the user input interface 150.

Moreover, the controller 170 may control the display 180 to display images, and may control the display 180 to display broadcast images input through the tuner 131, external input images input through the external device interface 135, images input through the network interface, or images stored in the memory 140. In this case, an image displayed on the display 180 may be a still image or video and also may be a 2D image or a 3D image.

Additionally, the controller 170 may play content stored in the display device 100, received broadcast content, and external input content input from the outside, and the content may be in various formats such as broadcast images, external input images, audio files, still images, accessed web screens, and document files.

The wireless communication circuit 173 may perform wired or wireless communication with an external device. The wireless communication circuit 173 may perform short-range communication with an external device. For this, the wireless communication circuit 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication circuit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication circuit 173 may detect (or recognize) a wearable device capable of communication around the display device 100. Furthermore, if the detected wearable device is a device authenticated to communicate with the display device 100, the controller 170 may transmit at least part of data processed in the display device 100 to the wearable device through the wireless communication circuit 173. Therefore, a user of the wearable device may use the data processed by the display device 100 through the wearable device.

The display 180 may convert image signals, data signals, or on-screen display (OSD) signals, which are processed in the controller 170, or images signals or data signals, which are received in the external device interface 135, into R, G, and B signals to generate driving signals.

Furthermore, the display device 100 shown in FIG. 2 is merely one embodiment of the present disclosure and thus, some of the components shown may be integrated, added, or omitted according to the specification of the actually implemented display device 100.

That is, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 2, the display device 100 may receive images through the network interface 133 or the external device interface 135 and play them without including the tuner 131 and the demodulator 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 2, an image processing device such as the separated set-top box, and a content playback device including the display 180 and the speaker 185.

The speaker 185 receives the audio-processed signal from the controller 170 to output an audio signal.

The power supply circuit 190 supplies the corresponding power to the entire display device 100. Particularly, power may be supplied to the controller 170 that is capable of being implemented in the form of a system on chip (SOC), the display 180 for displaying an image, the speaker 185 for outputting audio, and the like.

Specifically, the power supply circuit 190 may include a converter that converts AC power to DC power and a DC/DC converter that converts a level of the DC power.

The remote-control device 200 transmits a user input to the user input interface 150. To this end, the remote-control device 200 may use Bluetooth, RF (Radio Frequency) communication, IR (Infrared) communication, UWB (Ultra Wideband), ZigBee, and the like. In addition, the remote-control device 200 may receive images, voices, or data signals output from the user input interface 150 and display or output voices thereof on the remote-control device 200.

Figure 3:
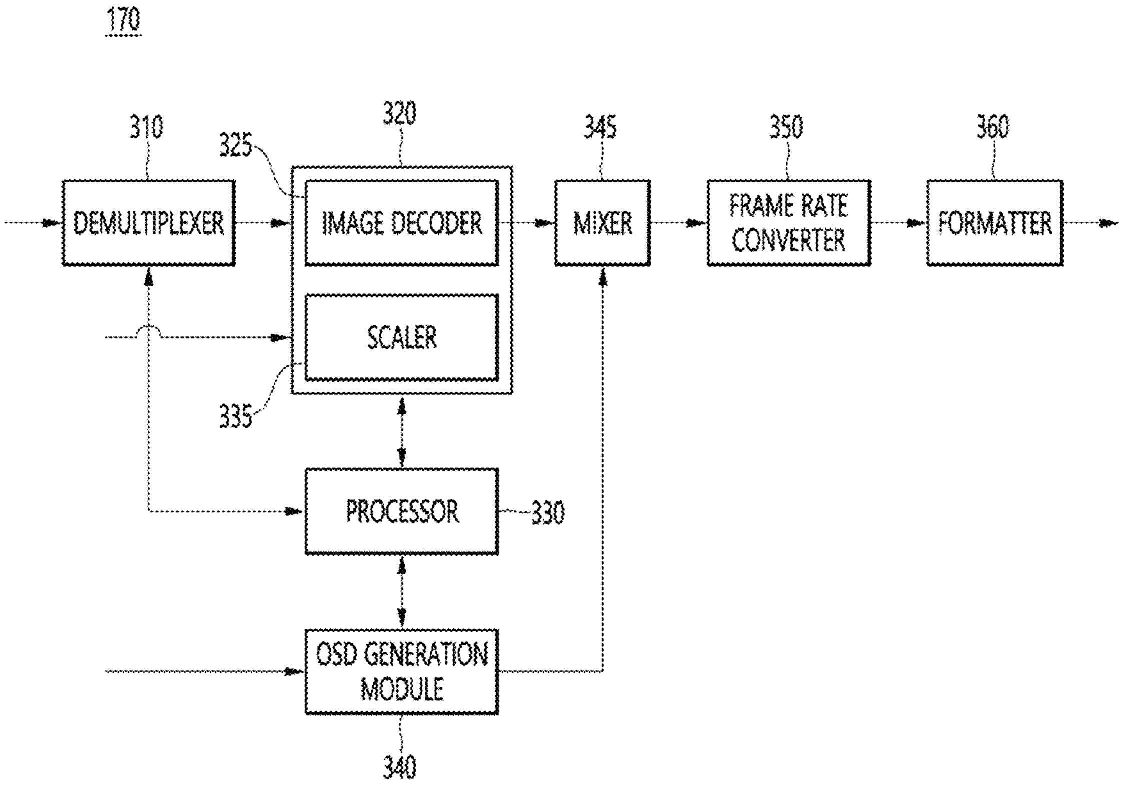
FIG. 3 is an example of an internal block diagram of the controller of FIG. 2.

FIG. 3 is an example of an internal block diagram of the controller of FIG. 2.

Referring to the drawing, the controller 170 according to an embodiment of the present disclosure may include a demultiplexer 310, an image processing module 320, a processor 330, an OSD generation module 340, a mixer 345, a frame rate converter 350, and a formatter 360. In addition, an audio processing module (not shown) and a data processing module (not shown) may be further included.

The demultiplexer 310 demultiplexes an input stream. For example, when MPEG-2 TS is input, the demultiplexer 310 may be demultiplexed to separate it into image, audio, and data signals, respectively. Here, the stream signal input to the demultiplexer 310 may be a stream signal output from the tuner 131, the demodulator 132, or the external device interface 135.

The image processing module 320 may perform image processing of a demultiplexed image signal. To this end, the image processing module 320 may be provided with an image decoder 325 and a scaler 335.

The image decoder 325 decodes the demultiplexed image signal, and the scaler 335 scales the resolution of the decoded image signal so that it may be output on the display 180.

The image decoder 325 may be provided with decoders of various standards. For example, it may be provided with an MPEG-2, H.264 decoder, a 3D image decoder for a color image and a depth image, a decoder for a multi-view image, and the like.

The processor 330 may control the overall operation within the display device 100 or the controller 170. For example, the processor 330 may control the tuner 131 to select (tuning) an RF broadcast corresponding to a channel selected by a user or a pre-stored channel.

In addition, the processor 330 may control the display device 100 by a user command or an internal program input through the user input interface 150.

Furthermore, the processor 330 may perform data transmission control with the network interface 135 or the external device interface 135.

In addition, the processor 330 may control the operation of the demultiplexer 310, the image processing module 320, the OSD generation module 340, and the like. within the controller 170.

The OSD generation module 340 generates an OSD signal based on a user input or on its own. For example, based on the user input signal, it may generate a signal for displaying various information as graphics or text on the screen of the display 180. The generated OSD signal may include various data such as a user interface screen of the display device 100, various menu screens, widgets, icons, and the like. In addition, the generated OSD signal may include a 2D object or a 3D object.

In addition, the OSD generation module 340 may generate a pointer that may be displayed on the display 180 based on a pointing signal input from a remote-control device 200. In particular, such a pointer may be generated by a pointing signal processing module, and the OSD generation module 340 may include such a pointing signal processing module (not shown). Of course, it is also possible for the pointing signal processing module (not shown) to be provided separately rather than being included in the OSD generation module 340.

The mixer 345 may mix the OSD signal generated by the OSD generation module 340 and the decoded image signal processed by the image processing module 320. The mixed image signal is provided to the frame rate converter 350.

The frame rate converter (FRC) 350 may convert the frame rate of the input image. Meanwhile, the frame rate converter 350 may also output it as is without a separate frame rate conversion.

Meanwhile, the formatter 360 may change the format of the input image signal into an image signal for display on the display and output it.

The formatter 360 may change the format of the image signal. For example, the format of the 3D image signal may be changed to one of various 3D formats, such as Side by Side format, Top/Down format, Frame Sequential format, Interlaced format, and Checker Box format.

Meanwhile, the audio processing module (not shown) in the controller 170 may perform audio processing of the demultiplexed audio signal. For this purpose, the audio processing module (not shown) may be provided with various decoders.

In addition, the audio processing module (not shown) in the controller 170 may process base, treble, volume control, and the like.

The data processing module (not shown) in the controller 170 may perform data processing of the demultiplexed data signal. For example, in the case that the demultiplexed data signal is an encoded data signal, it may be decoded. The encoded data signal may be electronic program guide information including broadcast information such as the start time and end time of the broadcast program broadcast on each channel.

Meanwhile, the block diagram of the controller 170 illustrated in FIG. 3 is a block diagram for one embodiment of the present disclosure. Each component of the block diagram may be integrated, added, or omitted according to the specifications of the controller 170 actually implemented.

In particular, the frame rate converter 350 and the formatter 360 may not be provided within the controller 170, but may be provided separately, or may be provided separately as one module.

Figure 4A:
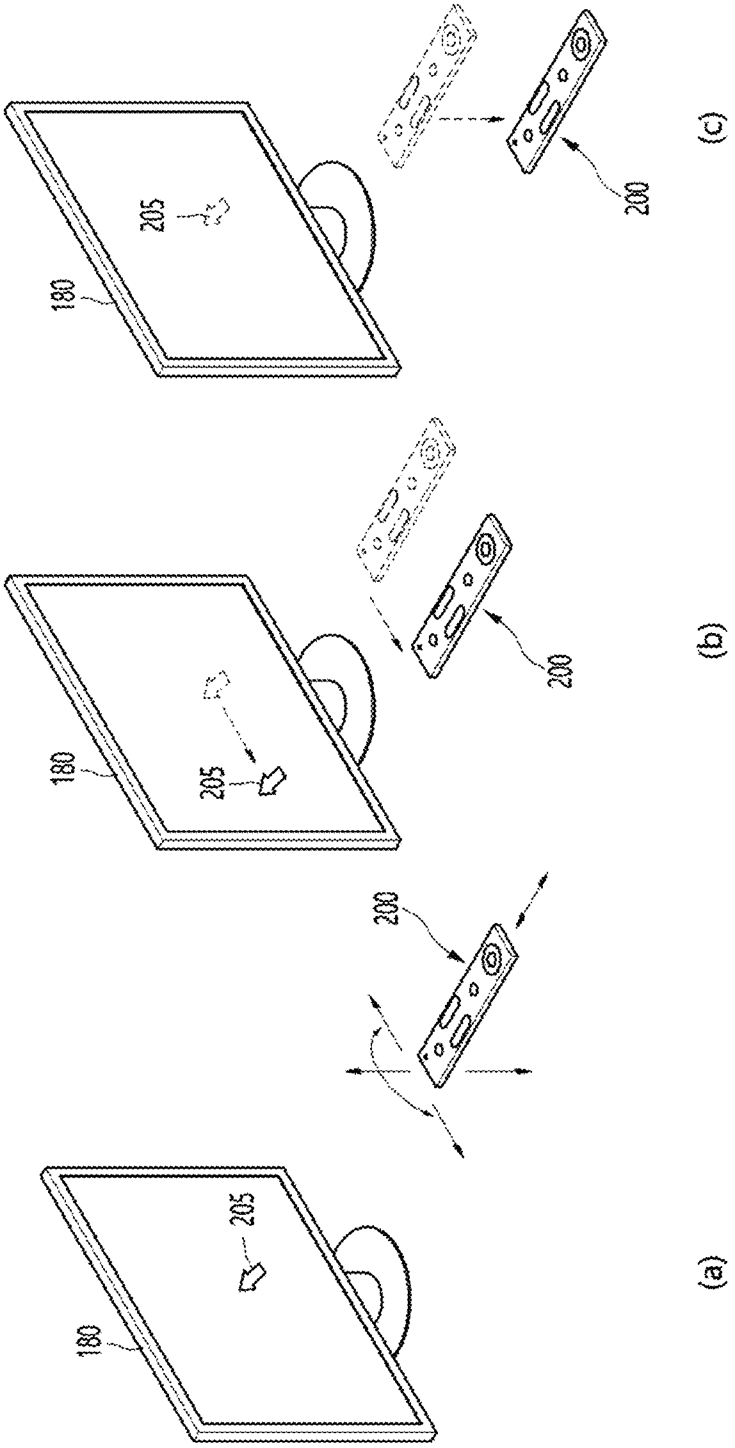
FIG. 4A is a diagram illustrating a control method of the remote-control device of FIG. 2.

FIG. 4A is a diagram illustrating a control method of the remote-control device of FIG. 2.

As illustrated in a of FIG. 4A, a pointer 205 corresponding to the remote-control device 200 is displayed on the display 180.

A user may move or rotate the remote-control device 200 up and down, left and right (b) of FIG. 4A, forward and backward (c) of FIG. 4A. The pointer 205 displayed on the display 180 of the display device corresponds to the movement of the remote-control device 200. This remote-control device 200 may be named a space remote-control or a 3D pointing device because the pointer 205 moves and is displayed according to the movement in 3D space, as illustrated in the drawing.

(b) of FIG. 4A exemplifies that when a user moves the remote-control device 200 to the left, the pointer 205 displayed on the display 180 of the display device also moves to the left in response.

Information about the movement of the remote-control device 200 detected by the sensor of the remote-control device 200 is transmitted to the display device. The display device may calculate the coordinates of the pointer 205 from the information about the movement of the remote-control device 200. The display device may display the pointer 205 in response to the calculated coordinates.

(c) of FIG. 4A exemplifies a case where a user moves the remote-control device 200 away from the display 180 while pressing a specific button in the remote-control device 200. As a result, a selection area in the display 180 corresponding to the pointer 205 may be zoomed in and displayed in an enlarged manner. Conversely, when the user moves the remote-control device 200 closer to the display 180, the selection area in the display 180 corresponding to the pointer 205 may be zoomed out and displayed in a reduced size. Meanwhile, when the remote-control device 200 moves away from the display 180, the selection area may be zoomed out, and when the remote-control device 200 moves closer to the display 180, the selection area may be zoomed in.

Meanwhile, when a specific button in the remote-control device 200 is pressed, the recognition of up, down, left, and right movements may be excluded. That is, when the remote-control device 200 moves away from or closer to the display 180, the up, down, left, and right movements may not be recognized, and only the forward and backward movements may be recognized. When a specific button in the remote-control device 200 is not pressed, only the pointer 205 moves according to the up, down, left, and right movements of the remote-control device 200.

Meanwhile, the moving speed or moving direction of the pointer 205 may correspond to the moving speed or moving direction of the remote-control device 200.

Figure 4B:
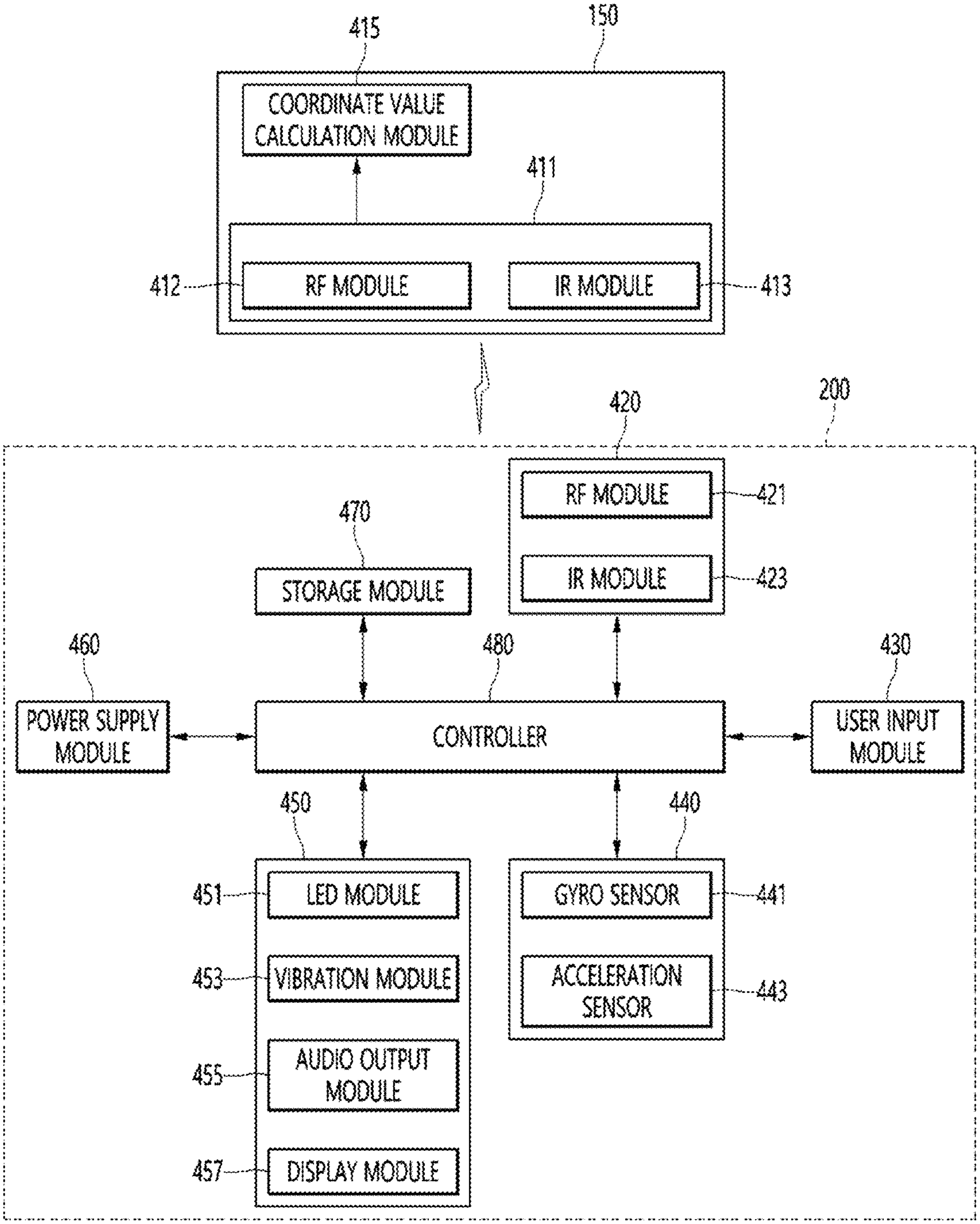
FIG. 4B is an internal block diagram of the remote-control device of FIG. 2.

FIG. 4B is an internal block diagram of the remote-control device of FIG. 2.

Referring to the drawing, the remote-control device 200 may include a wireless communication module 420, a user input module 430, a sensor module 440, an output module 450, a power supply module 460, a storage module 470, and a controller 480.

The wireless communication module 420 transmits and receives signals with any one of the display devices according to the embodiments of the present disclosure described above. Among the display devices according to the embodiments of the present disclosure, one display device 100 will be described as an example.

In this embodiment, the remote-control device 200 may be provided with an RF module 421 capable of transmitting and receiving signals with the display device 100 according to RF communication standards. In addition, the remote-control device 200 may be provided with an IR module 423 capable of transmitting and receiving signals with the display device 100 according to IR communication standards.

In this embodiment, the remote-control device 200 transmits a signal containing information about the movement of the remote-control device 200 to the display device 100 through the RF module 421.

In addition, the remote-control device 200 may receive a signal transmitted by the display device 100 through the RF module 421. In addition, the remote-control device 200 may transmit commands for power on/off, channel change, volume change, and the like. to the display device 100 through the IR module 423 as needed.

The user input module 430 may include a keypad, a button, a touch pad, or a touch screen. The user may input a command related to the display device 100 to the remote-control device 200 by operating the user input module 430. In the case that the user input module 430 has a hard key button, the user may input a command related to the display device 100 to the remote-control device 200 by pushing the hard key button. In the case that the user input module 430 has a touch screen, the user may input a command related to the display device 100 to the remote-control device 200 by touching a soft key of the touch screen. In addition, the user input module 430 may have various types of input means that the user may operate, such as a scroll key or a jog key, and the present embodiment does not limit the scope of the rights of the present disclosure.

The sensor module 440 may be provided with a gyro sensor 441 or an acceleration sensor 443. The gyro sensor 441 may sense information about the movement of the remote-control device 200.

For example, the gyro sensor 441 may sense information about the operation of the remote-control device 200 based on the x, y, and z axes. The acceleration sensor 443 may sense information about the movement speed of the remote-control device 200. Meanwhile, a distance measuring sensor may be additionally equipped, and thereby the distance to the display 180 may be sensed.

The output module 450 may output a video or audio signal corresponding to the operation of the user input module 430 or corresponding to a signal transmitted from the display device 100. Through the output module 450, the user may recognize whether the user input module 430 is being operated or whether the display device 100 is being controlled.

For example, the output module 450 may be provided with an LED module 451 that lights up when the user input module 430 is operated or a signal is transmitted and received with the display device 100 through the wireless communication module 420, a vibration module 453 that generates vibration, an audio output module 455 that outputs sound, or a display module 457 that outputs an image.

The power supply module 460 supplies power to the remote-control device 200. The power supply module 460 may reduce power waste by stopping the power supply when the remote-control device 200 does not move for a predetermined period of time. The power supply module 460 may resume the power supply when a predetermined key equipped on the remote-control device 200 is operated.

The storage module 470 may store various types of programs, application data, and the like. required for the control or operation of the remote-control device 200. In the case that the remote-control device 200 wirelessly transmits and receives signals through the display device 100 and the RF module 421, the remote-control device 200 and the display device 100 transmit and receive signals through a predetermined frequency band. The controller 480 of the remote-control device 200 may store and refer to information about the frequency band, and the like, that may wirelessly transmit and receive signals with the display device 100 paired with the remote-control device 200.

The controller 480 controls all matters related to the control of the remote-control device 200. The controller 480 may transmit a signal corresponding to a predetermined key operation of the user input module 430 or a signal corresponding to the movement of the remote-control device 200 sensed by the sensor module 440 to the display device 100 through the wireless communication module 420.

The user input interface 150 of the display device 100 may be provided with a wireless communication module 411 capable of wirelessly transmitting and receiving signals with the remote-control device 200, and a coordinate value calculation module 415 capable of calculating the coordinate values of a pointer corresponding to the operation of the remote-control device 200.

The user input interface 150 may wirelessly transmit and receive signals with the remote-control device 200 through the RF module 412. In addition, the remote-control device 200 may receive a signal transmitted according to the IR communication standard through the IR module 413.

The coordinate value calculation module 415 may calculate the coordinate value x, y of the pointer 205 to be displayed on the display 180 by correcting hand shake or error from the signal corresponding to the operation of the remote-control device 200 received through the wireless communication module 411.

The remote-control device 200 transmission signal input to the display device 100 through the user input interface module 150 is transmitted to the controller 170 of the display device 100. The controller 170 may determine information about the operation and key operation of the remote-control device 200 from the signal transmitted from the remote-control device 200 and control the display device 100 in response thereto.

As another example, the remote-control device 200 may calculate the pointer coordinate value corresponding to the operation and output it to the user input interface module 150 of the display device 100. In this case, the user input interface module 150 of the display device 100 may transmit information about the received pointer coordinate value to the controller 170 without a separate hand shake or error correction process.

In addition, as another example, the coordinate value calculation module 415 may be provided inside the controller 170 rather than the user input interface module 150 as shown in the drawing.

Figure 5:
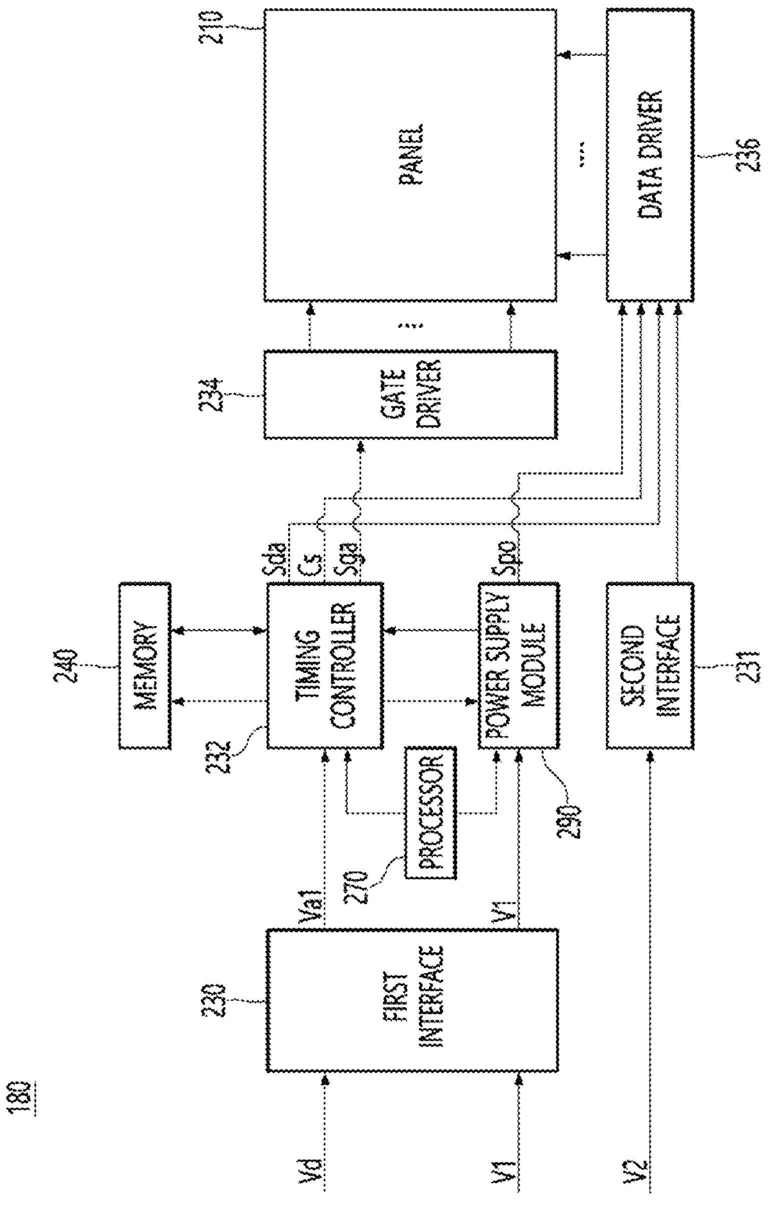
FIG. 5 is an internal block diagram of the display of FIG. 2.

FIG. 5 is an internal block diagram of the display of FIG. 2.

Referring to the drawing, the display 180 based on the organic light-emitting panel may include a panel 210, a first interface 230, a second interface 231, a timing controller 232, a gate driver 234, a data driver 236, a memory 240, a processor 270, a power supply module 290, and the like.

The display 180 may receive an image signal Vd, a first DC power supply V1, and a second DC power supply V2, and may display a predetermined image based on the image signal Vd.

Meanwhile, the first interface 230 in the display 180 may receive an image signal Vd and a first DC power supply V1 from the controller 170.

Here, the first DC power supply V1 may be used for the operation of the power supply module 290 and the timing controller 232 within the display 180.

Next, the second interface 231 may receive the second DC power supply V2 from the external power supply circuit 190. Meanwhile, the second DC power supply V2 may be input to the data driver 236 within the display 180.

The timing controller 232 may output the data driving signal Sda and the gate driving signal Sga based on the image signal Vd.

For example, when the first interface 230 converts the input image signal Vd and outputs the converted image signal va1, the timing controller 232 may output a data driving signal Sda and a gate driving signal Sga based on the converted image signal va1.

In addition to the video signal Vd from the controller 170, the timing controller 232 may further receive a control signal, a vertical synchronization signal Vsync, and the like.

In addition to the video signal Vd, the timing controller 232 may output a gate driving signal Sga for the operation of the gate driver 234 and a data driving signal Sda for the operation of the data driver 236 based on the control signal, the vertical synchronization signal Vsync, and the like.

At this time, the data driving signal Sda may be a data driving signal for driving RGBW subpixels when the panel 210 has RGBW subpixels.

Meanwhile, the timing controller 232 may further output a control signal Cs to the gate driver 234.

The gate driver 234 and the data driver 236 supply a scanning signal and an image signal to the panel 210 through the gate line GL and the data line DL, respectively, according to the gate driving signal Sga and the data driving signal Sda from the timing controller 232. Accordingly, the panel 210 displays a predetermined image.

Meanwhile, the panel 210 may include an organic light-emitting layer, and in order to display an image, a plurality of gate lines GL and data lines DL may be arranged in a matrix form to cross each pixel corresponding to the organic light-emitting layer.

Meanwhile, the data driver 236 may output a data signal to the panel 210 based on the second DC power V2 from the second interface 231.

The power supply module 290 may supply various powers to the gate driver 234, the data driver 236, the timing controller 232, and the like.

The processor 270 may perform various controls within the display 180. For example, it may control the gate driver 234, the data driver 236, the timing controller 232, and the like.

Figure 6A:
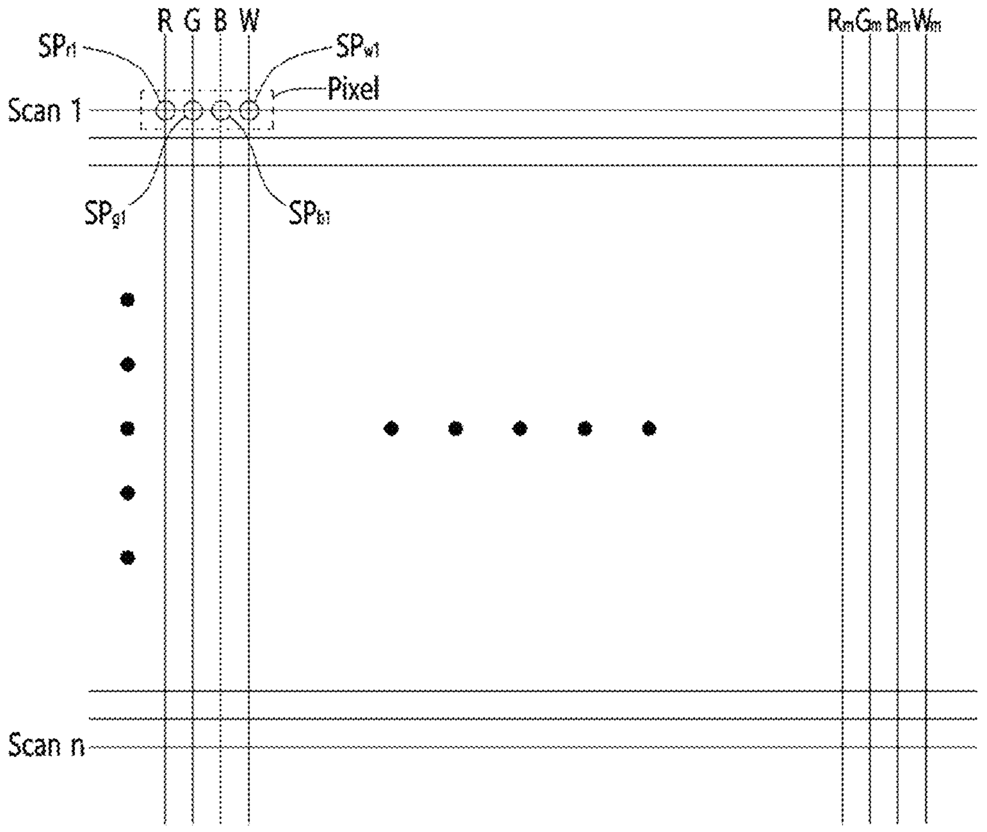
FIGS. 6A and 6B are diagrams for reference in the description of the organic light-emitting panel of FIG. 5.
Figure 6B:
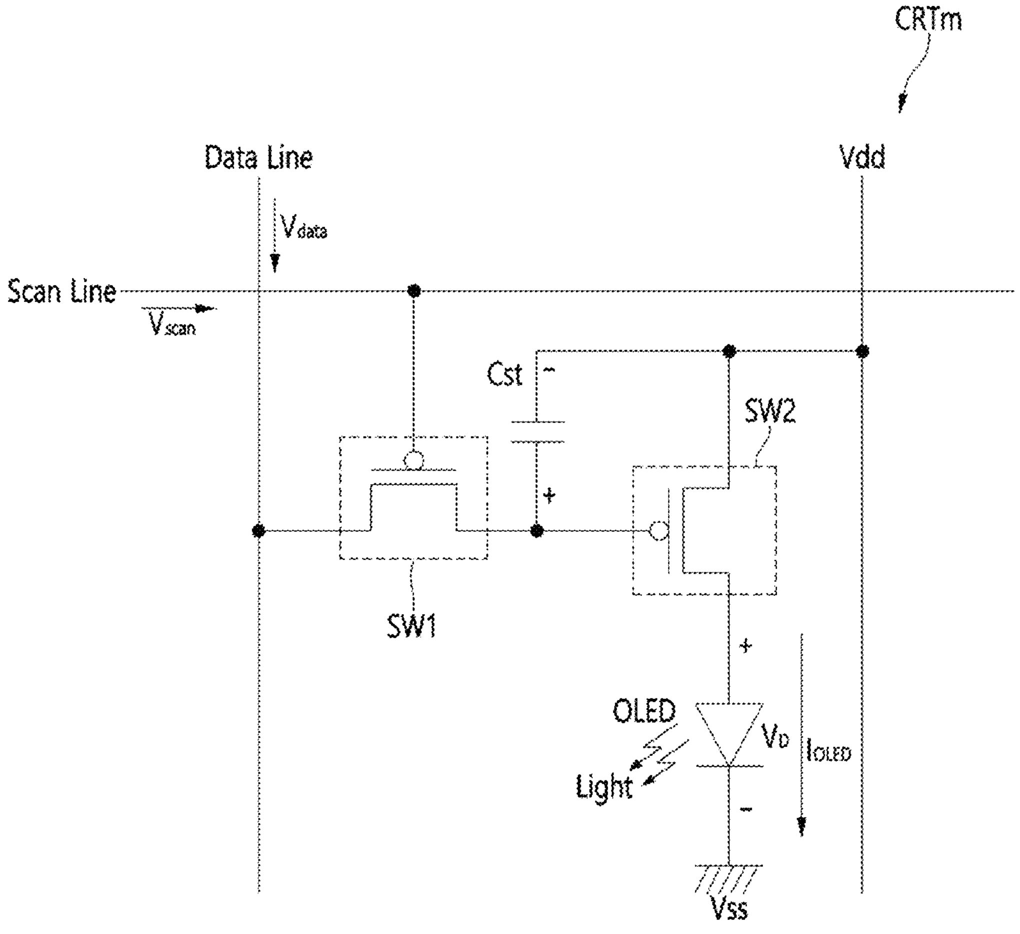

FIGS. 6A and 6B are diagrams for reference in the description of the organic light-emitting panel of FIG. 5.

First, FIG. 6A is a diagram illustrating pixels in the panel 210. The panel 210 may be an organic light-emitting panel.

Referring to the drawing, the panel 210 may have a plurality of scan lines Scan 1 to Scan n and a plurality of data lines R1, G1, B1, W1 to Rm, Gm, Bm, Wm intersecting therewith.

Meanwhile, a pixel is defined in an intersection area of the scan lines and data lines in the panel 210. In the drawing, a pixel having RGBW subpixels SPr1, SPg1, SPb1, SPw1 is shown.

In FIG. 6A, one pixel is illustrated as having RGBW sub-pixels, but one pixel may also have RGB sub-pixels. In other words, there is no limitation on the arrangement of pixel elements.

FIG. 6B illustrates a circuit of one sub-pixel within a pixel of the organic light-emitting panel of FIG. 6A.

Referring to the drawing, the organic light-emitting sub-pixel circuit CRTm may be an active type and may include a scan switching element SW1, a storage capacitor Cst, a driving switching element SW2, and an organic light-emitting layer OLED.

The scan switching element SW1 is turned on according to an input scan signal Vscan by connecting a scan line Scan Line to a gate terminal. When turned on, the input data signal Vdata is transmitted to the gate terminal of the driving switching element SW2 or one end of the storage capacitor Cst.

The storage capacitor Cst is formed between the gate terminal and the source terminal of the driving switching element SW2, and stores a predetermined difference between the data signal level transmitted to one end of the storage capacitor Cst and the DC power Vdd level transmitted to the other end of the storage capacitor Cst.

For example, when the data signal has different levels according to the PAM (Pulse Amplitude Modulation) scheme, the power level stored in the storage capacitor Cst varies depending on the level difference of the data signal Vdata.

As another example, when the data signal has different pulse widths according to the PWM (Pulse Width Modulation) method, the power level stored in the storage capacitor Cst varies depending on the pulse width difference of the data signal Vdata.

The driving switching element SW2 is turned on according to the power level stored in the storage capacitor Cst. When the driving switching element SW2 is turned on, a driving current IOLED proportional to the stored power level flows to the organic light-emitting layer OLED. Accordingly, the organic light-emitting layer OLED performs a light-emitting operation.

The organic light-emitting layer OLED includes an RGBW light-emitting layer (EML) corresponding to the sub-pixel, and may include at least one of a hole injection layer (HIL), a hole transport layer (HTL), an electron transport layer (ETL), or an electron injection layer (EIL), and may also include a hole blocking layer, and the like.

Meanwhile, the sub-pixels all output white light from the organic light-emitting layer OLED, but in the case of green, red, and blue sub-pixels, separate color filters are provided for color implementation. That is, in the case of green, red, and blue subpixels, green, red, and blue color filters are additionally provided, respectively. Meanwhile, in the case of white subpixels, since white light is output, a separate color filter is not required.

Meanwhile, in the drawing, the scan switching element SW1 and the driving switching element SW2 are exemplified as p-type MOSFETs, but n-type MOSFETs, or other switching elements such as JFETs, IGBTs, or SICs may also be used.

The controller 170 may determine the luminance of the image based on the APL (Average Picture level) of the input image. Specifically, the controller 170 may determine the luminance according to the APL of the input image using PLC (Peak Luminance Curve) data.

At this time, the PLC data may be data to which luminance according to the APL is mapped. The PLC data may be stored in the memory 140 in the form of a graph, table, and the like. that maps APL and luminance.

Figure 7:
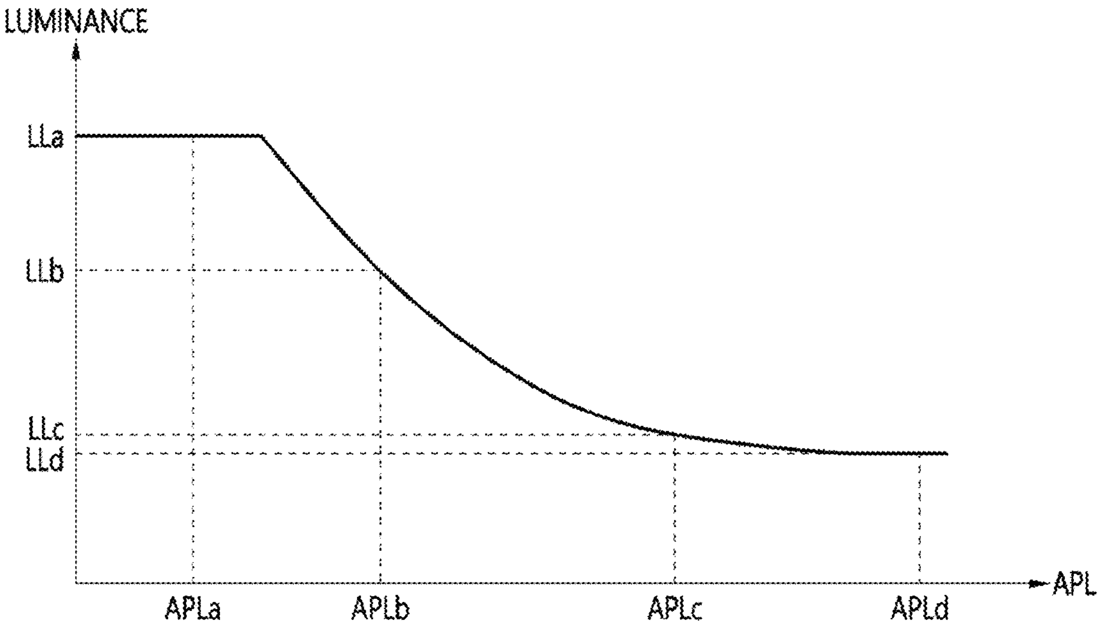
FIG. 7 is a diagram illustrating an example of PLC data according to an embodiment of the present disclosure.

FIG. 7 is a diagram illustrating an example of PLC data according to an embodiment of the present disclosure.

For example, the memory 140 may store the PLC data as illustrated in FIG. 7, and the PLC data of FIG. 7 may be data in which luminance is mapped according to the APL.

Referring to the PLC data of FIG. 7, it may include information such as the first APL APLa and the first luminance LLa being mapped, the second APL APLb and the second luminance LLb being mapped, the third APL APLc and the third luminance LLc being mapped, and the fourth APL APLd and the fourth luminance LLd being mapped. Therefore, the controller 170 may determine the luminance of the image as the first luminance LLa when the APL is the first APL APLa, and may determine the luminance of the image as the third luminance LLc when the APL is the third APL APLc.

Therefore, when an image is input, the controller 170 may calculate the APL of the input image and determine the luminance according to the calculated APL. The controller 170 may calculate the APL of the input image in modules of frames or scenes.

Next, a method for the controller 170 to calculate the APL of the input image will be described.

According to the first embodiment, the controller 170 may calculate the APL based on the maximum value of RGB of the input image. For example, the controller 170 may calculate the APL using a formula such as following Equation 1.

$$APL = \frac{\sum_{i=1,j=1}^{Resolution} \mathrm{Max}(R(i,j), G(i,j), B(i,j))/255}{\mathrm{Resolution}} \times 100 \qquad \text{[Equation 1]}$$

According to Equation 1, the controller 170 may calculate the APL based on the sum of the maximum values among the R, G, and B values of each pixel for all pixels. That is, the controller 170 may calculate the ratio of the sum of the maximum values among the R, G, and B values of each pixel of the input image compared to the full white image as the APL. Hereinafter, the APL calculation method according to the first embodiment is called the first method (or Max RGB method), but this is merely an example for the convenience of explanation, and thus it is reasonable that the present disclosure is not limited thereto.

According to the second embodiment, the controller 170 may calculate the APL based on the luminance ratio of the input image. Here, the luminance ratio may be a Y value converted according to the brightness ratio of RGB.

Specifically, the controller 170 may calculate the APL by converting the RGB of the input image into the luminance ratio. For example, the controller 170 may calculate APL through a formula such as following Equation 2.

$$APL = \frac{\sum_{i=1,j=1}^{Resolution} (0.21 * R(i,j) + 0.72 * G(i,j) + 0.07 * B(i,j))/255}{\mathrm{Resolution}} \times 100 \qquad \text{[Equation 2]}$$

According to Equation 2, the controller 170 may calculate the APL based on the sum of the values obtained by multiplying each of the R, G, and B values of each pixel by a predetermined coefficient for each pixel. That is, the controller 170 may calculate the APL as the ratio of the sum of the values obtained by multiplying each of the R, G, and B values of each pixel of the input image by a predetermined coefficient compared to the full white image. At this time, the coefficients may be set to 0.21 for the R value, 0.72 for the G value, and 0.07 for the B value, but this is merely an example and thus it is reasonable not to be limited thereto. Hereinafter, the APL calculation method according to the second embodiment is named the second method (or Y APL method), but this is merely an example for the convenience of explanation and thus it is reasonable not to be limited thereto.

Meanwhile, Equation 1 and Equation 2 assume that pixel data are 8 bits, and the constant 255 of Equation 1 and Equation 2 may change depending on the pixel data. For example, in the case that pixel data is 10 bits, the constant 255 of Equation 1 and Equation 2 need to be changed to 1023. The following description assumes that pixel data is 8 bits, but this is merely an example for the convenience of explanation, and it is reasonable that the present disclosure is not limited to this.

Table 1 below shows the APL calculated according to the Max RGB method and the Y APL method when the input image is Full White R, G, B=255, 255, 255, Full Red R, G, B=255, 0, 0, Full Green R, G, B=0, 255, 0, Full Blue R, G, B=0, 0, 255.

TABLE 1

| Factor | Full White APL | Full Red APL | Full Green APL | Full blue APL |
|---|---|---|---|---|
| Max RGB | 100% | 100% | 100% | 100% |
| Y APL | 100% | 21% | 72% | 7% |

According to the Max RGB method, the full white image, the full red image, the full green image, and the full blue image are all determined to have the same luminance. According to the example of FIG. 7, the luminance of the full white image, the full red image, the full green image, and the full blue image are all determined to have the first luminance LLa, and therefore, there is a problem that the luminance of the full red image, the full green image, or the full blue image with high chroma is outputted somewhat low.

On the other hand, according to the Y APL method, the luminance of the full red image, the full green image, or the full blue image is determined brightly compared to the full white image. Referring to the example of FIG. 7, the first APL APLa may be 7%, the second APL APLb may be 21%, the third APL APLc may be 72%, and the fourth APL APLd may be 100%, and therefore, the luminance of the full white image may be determined as the first luminance LLa, the luminance of the full green image may be determined as the second luminance LLb higher than the first luminance LLa, the luminance of the full red image may be determined as the third luminance LLc higher than the second luminance LLb, and the luminance of the full blue image may be determined as the fourth luminance LLd higher than the third luminance LLc. That is, according to the Y APL method, the luminance may be determined to be high depending on the color component of the image. However, if the image is continuously output with high luminance due to the color component of the image in this way, there is a disadvantage that afterimages increase and pixel lifespan decreases.

Accordingly, the present disclosure is intended to minimize the problem of low luminance output of high-chroma images while minimizing the problem of afterimage occurrence and pixel lifespan reduction. The display device 100 according to the embodiment of the present disclosure attempts to minimize the above-described problems by calculating APL considering chroma.

The controller 170 attempts to calculate the final APL by combining the APL according to the first method and the APL according to the second method according to chroma. More specifically, the controller 170 calculates the final APL by adjusting the APL proportion according to the second method Y APL method to be higher than the APL proportion according to the first method Max RGB method as the chroma increases, thereby improving the problem of low luminance output of high-chroma images, and adjusts the APL proportion according to the first method Max RGB method to be higher than the APL proportion according to the second method Y APL method as the chroma decreases, thereby improving the problem of afterimage occurrence and pixel lifespan reduction due to high luminance output.

Figure 8:
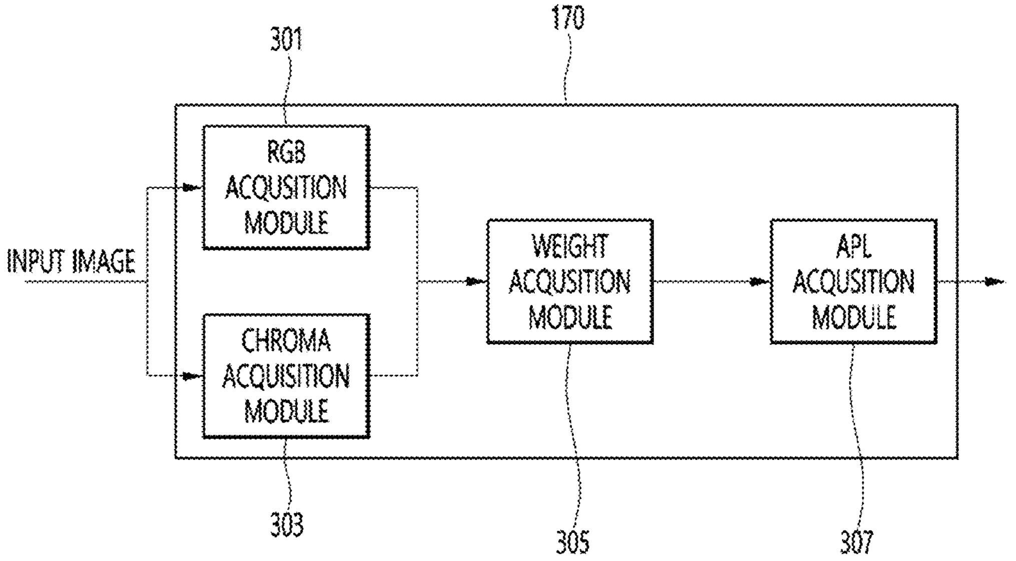
FIG. 8 is a control block diagram for explaining a method for calculating APL by considering chroma in a display device according to an embodiment of the present disclosure.

FIG. 8 is a control block diagram for explaining a method for calculating APL by considering chroma in a display device according to an embodiment of the present disclosure.

The display device 100 according to an embodiment of the present disclosure may include an RGB acquisition module 301, a chroma acquisition module 303, a weight acquisition module 305, and an APL acquisition module 307. The above-described configurations are illustrated as different configurations distinguished according to their roles, but this is merely an example for convenience of explanation. That is, at least two or more of the above-described configurations may be implemented as one configuration.

According to an embodiment of the present disclosure, the RGB acquisition module 301, the chroma acquisition module 303, the weight acquisition module 305, and the APL acquisition module 307 may be included in the controller 170. That is, the controller 170 may include the RGB acquisition module 301, the chroma acquisition module 303, the weight acquisition module 305, and the APL acquisition module 307.

The RGB acquisition module 301 may obtain RGB of an input image. The RGB acquisition module 301 may obtain RGB of each frame of the input image. The RGB acquisition module 301 may obtain RGB of each pixel of each frame. Here, RGB may mean an R value, a G value, and a B value. The R value, the G value, and the B value may vary depending on the pixel data. For example, when the pixel data is 8 bits, the R value, the G value, and the B value may have values of 0 to 255, and when the pixel data is 10 bits, the R value, the G value, and the B value may have values of 0 to 1023.

The chroma acquisition module 303 may obtain the chroma of the input image. The chroma acquisition module 303 may obtain the chroma of each frame of the input image. According to one embodiment, the chroma acquisition module 303 may obtain the chroma through a formula such as Equation 3.

$$V = \max(R, G, B)$$

$$S = \begin{cases} \dfrac{V - \min(R, G, B)}{V} & \text{if } V \neq 0 \\ 0 & \text{if } V = 0 \end{cases}$$

[Equation 3]

That is, the chroma acquisition module 303 may obtain chroma by dividing the difference between the maximum and minimum values of the R, G, and B values by the maximum value for each pixel. For example, the chroma acquisition module 303 may obtain chroma as 1 (i.e., 100%) when the R, G, and B values are 255, 0, and 0, and may obtain chroma as 0 (i.e., 0%) when the R, G, and B values are 255, 255, and 255, and may obtain chroma as 0.68 (i.e., 68%) when the R, G, and B values are 207, 65, and 209.

The weight acquisition module 305 may obtain weight according to the chroma obtained by the chroma acquisition module 303. Here, the weight may be a constant that determines the APL weight according to the first method and the APL weight according to the second method to be reflected in the final APL. The weight acquisition module 305 may obtain the weight differently according to the chroma. The weight acquisition module 305 may obtain the weight based on weight data in which the weight according to the chroma is mapped in advance, and this will be described in detail in FIG. 10.

The weight acquisition module 305 may determine the weight so that the final APL with a higher proportion of the APL according to the second method is produced as the chroma is higher, and the weight so that the final APL with a higher proportion of the APL according to the first method is produced as the chroma is lower.

The APL acquisition module 307 may finally obtain the APL of the input image based on the weight obtained by the weight acquisition module 305.

The controller 170 may determine the luminance of the output image based on the finally obtained APL. The display 180 may output an image based on the luminance determined according to the finally obtained APL.

Figure 9:
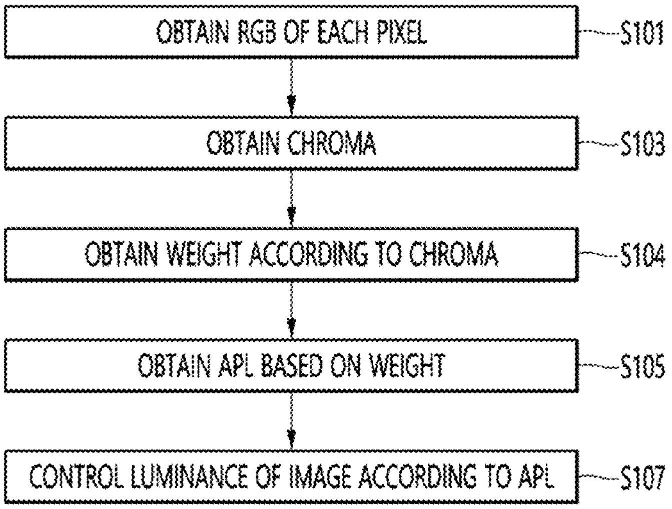
FIG. 9 is a flowchart illustrating an operation method of a display device according to an embodiment of the present disclosure.

FIG. 9 is a flowchart illustrating an operation method of a display device according to an embodiment of the present disclosure.

The controller 170 may obtain RGB of each pixel (step S101).

The controller 170 may obtain chroma based on RGB of each pixel (step S103).

The controller 170 may obtain a weight according to the chroma (step S104).

Weight data may be stored in the memory 140, and the controller 170 may obtain a weight according to chroma based on the weight data.

Figure 10:
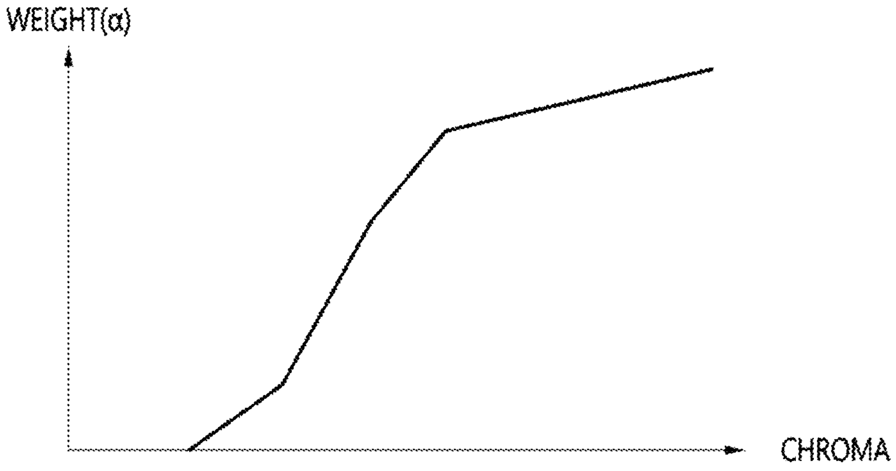
FIG. 10 is a diagram illustrating an example of weight data according to an embodiment of the present disclosure.

Referring to FIG. 10, the weight data according to an embodiment of the present disclosure is described.

FIG. 10 is a diagram illustrating an example of weight data according to an embodiment of the present disclosure.

The weight data may be data in which a weight α is mapped by the chroma. The weight data may be stored in the form of a curve, a LUT (Look-Up Table), and the like, according to the chroma.

The weight data may be mapped with chroma and weight so that the higher the chroma, the higher the weight α. For example, the weight data may be mapped with chroma and weight so that the weight α is 0 when chroma is 0, and the weight α has a maximum value when chroma is 1 (i.e., 100%), and the maximum value may be 255, but this is only an example and may vary depending on the pixel data.

Meanwhile, the chroma and the weight α may be directly proportional, but may also be proportional according to a predetermined proportional constant k. In addition, the predetermined proportional constant k may vary depending on the chroma range. For example, when the chroma is 0 to 0.3 0 to 30%, the weight is proportional to the chroma according to the proportional constant 0.8, when the chroma is 0.3 to 0.7 30 to 70%, the weight is proportional to the chroma according to the proportional constant 1.2, and when the chroma is 0.7 to 1 70 to 100%, the weight may be proportional to the chroma according to the proportional constant 1, but this is only an example for the convenience of explanation, and it is reasonable that the present disclosure is not limited thereto.

For example, the controller 170 may obtain the weight α as the first value when the chroma is the first level, and may obtain the weight α as the second value higher than the first value when the chroma is the second level higher than the first level.

Again, FIG. 9 is described.

The controller 170 may obtain the APL based on the weight (step S105).

The controller 170 may obtain the APL by combining the APL according to the first method and the APL according to the second method according to the weight. That is, the controller 170 may determine the proportion of APL according to the first method and the proportion of APL according to the second method in the finally obtained APL according to the weight. In this way, the final APL according to the weight may be calculated based on following Equation 4.

$$APL = APL_{according\ to\ second\ method} * \left(\frac{\alpha}{255}\right) + APL_{according\ to\ first\ method} * \left(1 - \frac{\alpha}{255}\right) \quad \text{[Equation 4]}$$

Here, the first method and the second method are as described above. That is, the first method is a Max RGB method that calculates APL based on the maximum value of RGB of the input image, and the second method is a Y APL method that calculates APL based on the luminance ratio of the input image.

And, as may be seen by referring to mathematical expression 4, the higher the weight α, the higher the proportion of APL according to the second method, and the lower the weight α, the higher the proportion of APL according to the first method may be finally calculated. That is, the controller 170 may obtain a higher weight α as the chroma is higher, and calculate the final APL with a higher proportion of APL according to the second method, and obtain a lower weight α as the chroma is lower, and calculate the final APL with a higher proportion of APL according to the first method.

Meanwhile, according to an embodiment, the controller 170 may calculate the APL using an Equation other than Equation 4 so that the higher the chroma, the lower the weight α, and instead, the lower the weight α, the higher the proportion of APL according to the second method.

In summary, the present disclosure may calculate the final APL by increasing the proportion of APL according to the second method as the chroma becomes high, and may calculate the final APL by increasing the proportion of APL according to the first method as the chroma becomes low.

According to the first method, there was a disadvantage that luminance is reduced due to the tendency for APL to be calculated high regardless of whether the image had high chroma or low chroma. However, as in the present disclosure, by calculating the final APL by lowering the proportion of APL according to the first method and increasing the proportion of APL according to the second method as the chroma increases, the problem of luminance reduction of the image with high chroma may be minimized.

In addition, according to the second method, since the APL is obtained low depending on the color component, high luminance may be output, and thus afterimage problems and reduced pixel lifespan problems may occur.

Therefore, the controller 170 has the advantage of being able to minimize the luminance degradation problem by increasing the proportion of APL according to the second method as the chroma increases, while solving the afterimage problem and the pixel lifespan degradation problem by increasing the proportion of APL according to the first method as the chroma decreases.

The controller 170 may control the luminance of the image according to the APL (step S107).

The controller 170 may obtain the luminance according to the finally calculated APL based on the PLC data as described in FIG. 7, and output the image according to the obtained luminance.

In summary, the controller 170 obtains the luminance of the image to be output on the display 180 based on the APL (Average Picture Level) of the input image, and at this time, the APL may be obtained based on the chroma of the input image. Specifically, the controller 170 may calculate the first APL based on the RGB maximum value of the input image, calculate the second APL based on the luminance ratio of the input image, and obtain the final APL by combining the first APL and the second APL based on the chroma. That is, the controller 170 may adjust the proportion of the first APL and the second APL according to the chroma of the input image. The controller 170 may obtain the final APL so that the proportion of the second APL is higher than that of the first APL as the chroma of the input image is higher. The controller 170 may determine the weight based on the chroma of the input image, and adjust the proportions of the first APL and the second APL according to the weight. To this end, the memory 140 may store weight data that adjusts the proportion of the first APL and the second APL according to the weight, and the weight data may include a lookup table in which chroma and weight are mapped so that the proportion of the second APL is adjusted higher than that of the first APL as the chroma of the input image is higher. In addition, the memory 140 may further store PLC data in which the luminance of the output image according to the APL is mapped.

Next, referring to FIG. 11, the luminance of the output image according to the various APL calculation methods of the present disclosure will be described.

Figure 11:
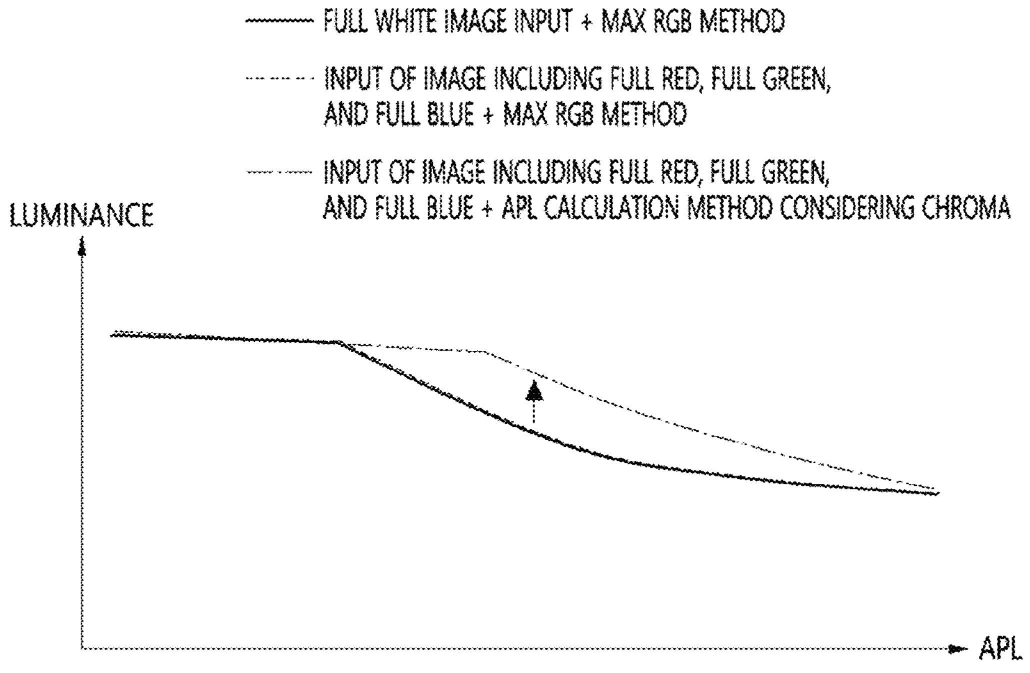
FIG. 11 is a graph illustrating luminance according to an input image in a display device according to an embodiment of the present disclosure.

FIG. 11 is a graph illustrating luminance according to an input image in a display device according to an embodiment of the present disclosure.

The first graph G1 is a graph showing luminance according to the APL calculated according to the first method when a full white R, G, B=255, 255, 255 image is input. In particular, the first graph G1 may show luminance for various APLs while increasing the area of the black area compared to the full white area.

The second graph G2 is a graph showing luminance according to the APL calculated according to the first method when an image consisting of full red R, G, B=255, 0, 0, full green R, G, B=0, 255, 0, and full blue R, G, B=0, 0, 255 is input. In particular, the second graph G2 may represent luminance for various APLs while increasing the area of the black area compared to the full red, full green, and full blue areas.

Referring to the first and second graphs G1 and G2, it may be identified that the luminance according to the APL is the same whether it is a full white image or an image composed of full red, full green, and full blue. In other words, even in the case that an image with a color component is input, it is output with the same luminance as a white image, so in the case of an image with a color component, the brightness may feel dark.

Meanwhile, the third graph G3 is a graph showing luminance according to the APL calculated by considering chroma when an image composed of full red R, G, B=255, 0, 0, full green R, G, B=0, 255, 0, and full blue R, G, B=0, 0, 255 is input. That is, the third graph G3 is a graph that shows the luminance according to the APL calculated by combining the APL according to the first method and the APL according to the second method based on the weight according to chroma when an image composed of full red, full green, and full blue is input. In particular, the third graph G3 may show the luminance for various APLs while increasing the area of the black area compared to the full red, full green, and full blue areas.

Referring to the second and third graphs G2 and G3, even when an image composed of the same full red, full green, and full blue is input, it may be identified that the luminance is output higher as the chroma is higher when calculating the APL by considering the weight according to chroma. That is, the display 180 may output an image with the first luminance when a full white image is input, and may output an image with the second luminance higher than the first luminance when an image composed of full red, full green, and full blue is input.

According to one embodiment of the present disclosure, the above-described method may be implemented as a code that may be read by a processor on a medium in which a program is recorded. Examples of the medium that may be read by a processor include ROM, RAM, CD-ROM, magnetic tape, floppy disk, optical data storage device, and the like.

The display device described above is not limited to the configuration and method of the embodiments described above, and the embodiments may be configured by selectively combining all or part of each embodiment so that various modifications may be made.

The invention claimed is:

1. A display device comprising:
- a display; and
- a controller configured to obtain a luminance of an image to be output from the display based on an APL (Average Picture level) of an input image,
- wherein the controller is configured to:
- obtain the APL based on a chroma of the input image, wherein the APL is a final APL obtained by combining a first APL and a second APL based on the chroma,
- calculate the first APL based on a maximum RGB value of the input image,
- calculate the second APL based on a luminance ratio of the input image, wherein the luminance ratio is a luma (Y) value converted according to a brightness ratio of a RGB value, and
- obtain the final APL by combining the first APL and the second APL based on the chroma.

2. The display device according to claim 1, wherein the controller is configured to:
- adjust a proportion of the first APL and the second APL according to the chroma of the input image.

3. The display device according to claim 2, wherein the controller is configured to:
- obtain the final APL so that the proportion of the second APL is higher than that of the first APL as the chroma of the input image becomes higher.

4. The display device according to claim 2, wherein the controller is configured to:
- determine a weight based on the chroma of the input image, and
- adjust the proportion of the first APL and the second APL according to the weight.

5. The display device according to claim 4, further comprising a memory configured to store weight data that adjusts the proportion of the first APL and the second APL according to the weight.

6. The display device according to claim 5, wherein the weight data includes a lookup table in which the chroma and the weight are mapped so that the proportion of the second APL is adjusted higher than that of the first APL as the chroma of the input image becomes higher.

7. The display device according to claim 5, wherein the memory is further configured to store PLC (Peak Luminance Curve) data to which the luminance of the output image according to the APL is mapped.

8. The display device according to claim 1, wherein the display is configured to:

output an image with a first luminance based on a full white image being input, and output an image with a second luminance higher than the first luminance based on an image including full red, full green, and full blue being input.

9. The display device according to claim 1, wherein the controller is further:

configured to obtain RGB of the input image;

configured to obtain a chroma of the input image;

configured to obtain a weight based on the chroma of the input image; and configured to obtain the APL based on a weight.

10. A method of operating a display device, comprising:

obtaining a final APL (Average Picture level) of an input image;

obtaining a luminance based on the final APL of the input image; and outputting the image with the obtained luminance, wherein the method further comprises obtaining the final APL based on a chroma of the input image, wherein obtaining the final APL comprises:

calculating a first APL based on an RGB maximum value of the input image;

calculating a second APL based on a luminance ratio of the input image, wherein the luminance ratio is a luma (Y) value converted according to a brightness ratio of a RGB value; and obtaining the final APL by combining the first APL and the second APL based on the chroma.

11. The method according to claim 10, wherein obtaining the final APL further comprises:

adjusting a proportion of the first APL and the second APL according to the chroma of the input image.

12. The method according to claim 11, wherein adjusting the proportion of the first APL and the second APL comprises:

determining a weight based on the chroma of the input image, and adjusting the proportion of the first APL and the second APL according to the weight.

13. The method according to 12, further comprising:

storing weight data in which the chroma and the weight are mapped so that the proportion of the second APL is adjusted higher than that of the first APL as the chroma of the input image becomes high.

* * * * *